ANODE FOR CATHODIC PROTECTION SYSTEM

Filed Dec. 11, 1961 3 Sheets-Sheet 1

*INVENTORS*
WILLIAM T. BRYAN,
JOHN L. ARWINE &
DONN W. DUFFEY
*BY*
Marechal Biebel French & Bugg
ATTORNEYS March 8, 1966 W. T. BRYAN ETAL 3,239,443
ANODE FOR CATHODIC PROTECTION SYSTEM
Filed Dec. 11, 1961 3 Sheets-Sheet 2
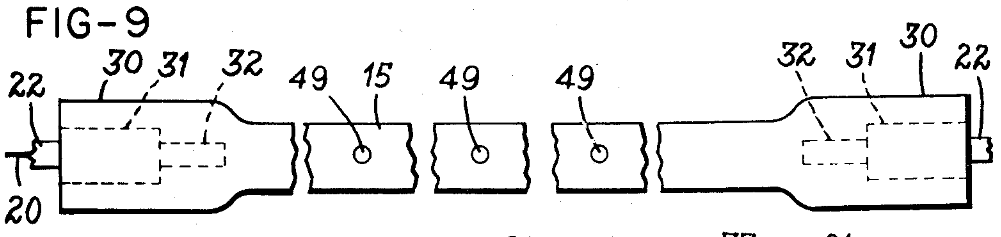
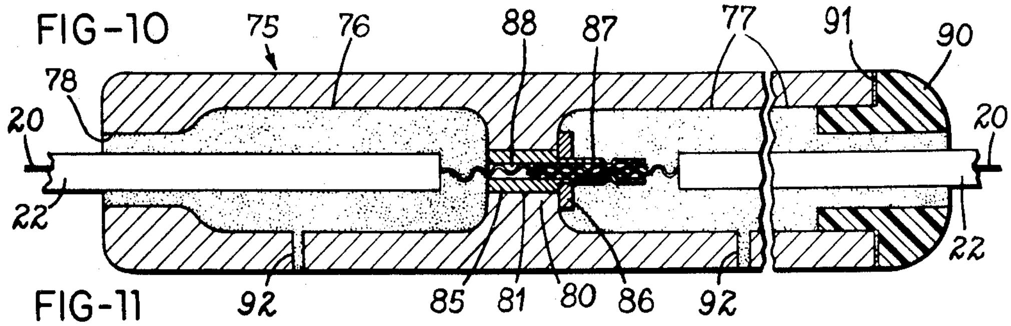
FIG-11
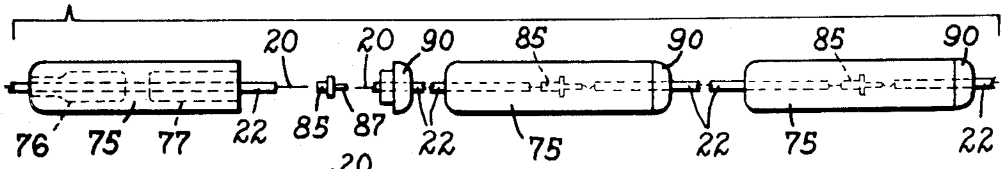
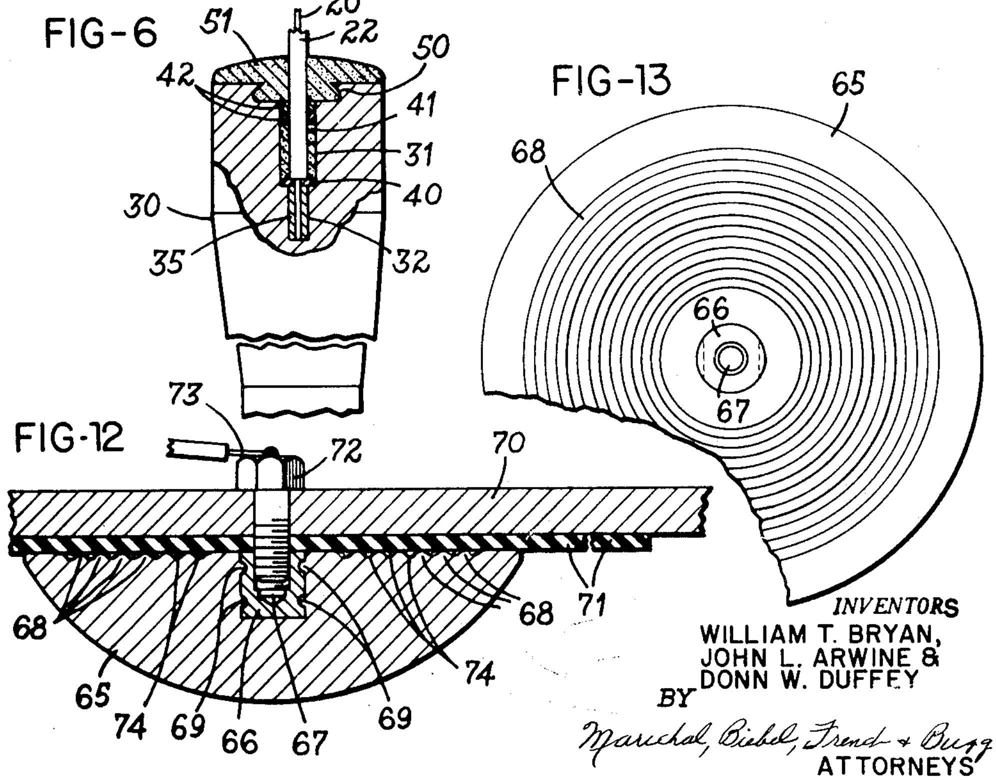
FIG-6, FIG-13, FIG-12
INVENTORS
WILLIAM T. BRYAN,
JOHN L. ARWINE &
DONN W. DUFFEY
BY Marechal, Biebel, French & Bugg
ATTORNEYS March 8, 1966 W. T. BRYAN ETAL 3,239,443

ANODE FOR CATHODIC PROTECTION SYSTEM

Filed Dec. 11, 1961 3 Sheets-Sheet 3

INVENTORS
WILLIAM T. BRYAN,
JOHN L. ARWINE &
DONN W. DUFFEY

BY

Marechal, Biebel, French & Bugg
ATTORNEYS

United States Patent Office 3,239,443

Patented Mar. 8, 1966

3,239,443

ANODE FOR CATHODIC PROTECTION SYSTEM

William T. Bryan, John L. Arwine, and Donn W. Duffey, all of Dayton, Ohio, assignors to The Duriron Company, Inc., Dayton, Ohio, a corporation of New York Filed Dec. 11, 1961, Ser. No. 158,490
4 Claims. (Cl. 204—196)

This invention relates to cathodic protection systems for combating and inhibiting corrosions in metallic structures subjected to electrolytic corrosive action in the surrounding medium in which they are installed and, more particularly, to anode structures for such cathodic protection systems.

Structures such as metal pipe lines, underground cables and conduits, metal tanks and steam pipes, metal piers, etc., may be subjected to substantial and expensive electrolytic corrosion as installed beneath the surface of the ground, in sea water, under streams, and/or otherwise in contact with an electrolytic medium or environment. Such corrosive action may result from electrolytic cell action through the surrounding medium in which the metallic structure becomes anodic with respect to another object or another part of the same structure so that metal in the structure is actually electrochemically removed from those portions of the structure which are anodic with respect to another element of the electrolytic cell, and, since such anodic areas are frequently small by comparison to the cathodic object or area, a high current density may result at the anode causing rapid failure of the structure.

One method of combating such corrosion is to provide adjacent the corrosive structure a so-called cathodic protection system in which an anode is provided in electrolytic cell relation with the structure to be protected and a suitable electric current is impressed to maintain the anode anodic with respect to the structure to be protected thereby avoiding electrochemical removal of material from the structure. Such a cathodic protection system and apparatus therefor is described in the copending application of Walter A. Luce and Marselio G. Fontana, Serial No. 440,448 filed June 30, 1954, and now abandoned, in which the use of a high silicon iron casting is disclosed for the protecting anode as providing increased anode life and enhanced electrolytic and electrochemical characteristics for impressed current cathodic protection systems.

Especially with the cathodic protection of extended subterranean pipe lines and electrical cables, as well as with large metal piers, and the like, it is desired that the cathodic protection system itself have as long a life as possible to reduce maintenance problems, etc. In such systems, of course, the action of the impressed current in the cathodic protection of a metal structure may accelerate or enhance the possibility of corrosive destruction of the protecting anode and its appurtenant wiring. It has been found, particularly, that the point of connection of the wiring leads to the protecting anode are especially subjected to electrolytic corrosion, as well as are such "weak links" in the protection and as points of juncture of two anodes, etc.

It has also been discovered that optimum electrochemical characteristics of either anode materials or interconnecting wiring may be inconsistent with the mechanical strength and/or electroconductive characteristics of various materials. For example, a specific high silicon iron of desired electrochemical and anticorrosion characteristics for an anode may have such high brittleness, lack of machineability, and poor tensile or impact strength as to be, alone, impractical to withstand or conform to the physical requirements of some installations and/or metallurgically ill-suited to electrical connection with a lead wire in a manner which will protect the point of connection from excessive corrosion and failure in a shorter time than the expected and desired anode life.

According to this invention, which is copending with application Serial No. 588,563, filed May 31, 1956, now abandoned, and assigned to the same assignee, structures are provided for the electrical and mechanical connection of the anodes in a cathodic protection system to provide protection of the electrical connection, increased mechanical strength at the point of connection, and protection of the point of connection from accelerated corrosion thereof, and even with anode materials otherwise less than optimumly suited for withstanding or conforming to the physical and mechanical forces to which subjected in a cathodic protection installation.

One object of this invention is to provide, in an electrode of the character described, a protected electrical connection for connecting the electrode to a lead wire and protecting the connection from corrosive attack.

Another object of this invention is to provide, in an electrode of the character described, mechanical connecting structure for joining one electrode to another or to a lead wire notwithstanding that the body of the electrode be formed of a material unsuited to provide a machineable or weldable connecting surface.

Still another object of this invention is to provide connecting means for electrodes of the character described for interconnecting a plurality of electrodes with one or more lead wires to produce an electroconductive juncture which will withstand the tensile and other mechanical forces to which it is subjected in use.

A still further object of this invention is to provide an electrode of the character described having means for mechanically and electrically connecting a lead wire to withstand mechanical and electrical forces to which subjected in use and including means for protecting the connection from the effects of corrosion in use.

Other objects and advantages of this invention will be apparent from the following description, the accompanying drawings and the appended claims.

In the drawings—

FIG. 6 is a view partly in longitudinal section of a further application of this invention to the connection between a lead wire and a cathodic protection anode;

FIG. 9 is a view in elevation of another form of cathodic protection anode embodying this invention;

FIG. 10 is a view in longitudinal section of an anode embodying this invention and adapted to be connected to a lead wire intermediate the ends thereof;

FIG. 11 is a diagrammatic view of a plurality of the anodes of FIG. 10 connected to a lead wire at various points therealong;

FIG. 12 is a view in transverse section of another form of anode embodying this invention for installation on the hull of a ship or side of a tank;

FIG. 13 is a top plan view of the anode of FIG. 12;

Figures 1, 2, 3, 4:
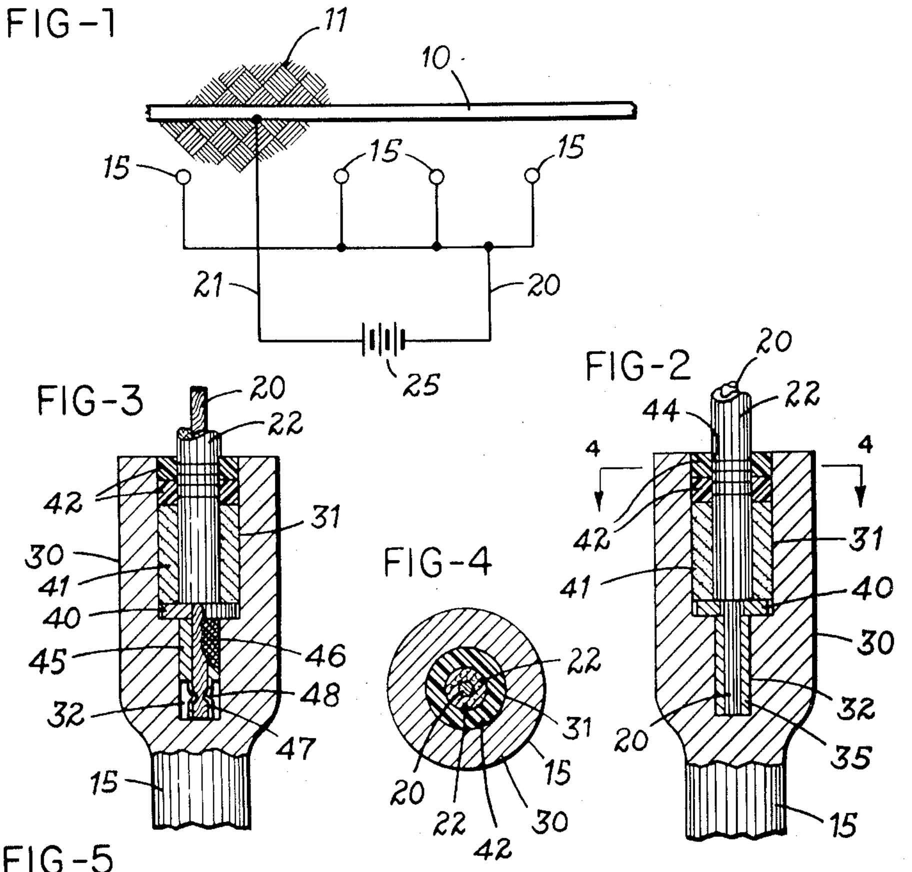
FIG. 1 is a diagrammatic representation of a cathodic protection system applied to a subterranean pipe line.
FIG. 2 is a view partially in longitudinal section through a connection of the lead wire to the anode for a cathodic protection system embodying this invention.
FIG. 3 is a view similar to FIG. 2 illustrating a different lead wire connection for a cathodic protection system embodying this invention.
FIG. 4 is a transverse section along the line 4—4 of FIG. 2.

Referring to the drawings in which like reference characters designate like parts throughout the several views thereof, an illustrative cathodic protection system is diagrammed in FIG. 1 as being applied to a subterranean pipe line 10, buried in earth indicated as 11. At various points along pipe line 10 as indicated by the potential corrosion factors (as more particularly explained in copending application of Marselio G. Fontana and Walter N. Luce, Serial No. 440,448, filed June 30, 1954) one or more anodes 15 are placed adjacent and in electrolytic cell relation with pipe line 10. Although the electrodes 15 are shown in the line parallel to pipe line 10, it will be understood that in practice such electrodes are situated with respect to the pipe line in accordance with the particular characteristics of the environment and to give uniform protection. Electrodes 15 and pipe line 10 are connected by electric conductors or lead wires 20 and 21 to a source of direct current shown diagrammatically as battery 25, with electrodes 15 connected to the positive side of the direct current sources and pipe line 10 to the negative side. It will be understood that the source of direct current as indicated at 25 may be any suitable direct current source such as a dynamo, battery, or suitably rectified alternating current.

With such an arrangement, and with the impressed direct current from battery 25 of a sufficient quantity and potential as explained in said copending application Serial No. 440,448, a current is impressed upon the electrical cell formed by electrodes 15 and pipe line 10 through the surrounding medium such as the earth 11 so as to maintain the electrodes 15 anodic with respect to pipe line 10, thereby preventing or inhibiting the electrochemical removal of metal from pipe line 10. As will be apparent, such an arrangement provides for and, indeed, accelerates electrochemical corrosion of the anodes 15. Accordingly, the efficiency of the cathodic protection system and the length of time which the system will remain operative without necessity for maintenance or replacement of the anode is dependent to a large extent on the construction and composition of the anodes themselves, as more particularly appears from said copending application.

In said copending application, a preferred material for anodes for such a cathodic protection system is a high silicon cast iron having an excess of about 10% silicon content and, preferably, a high silicon cast iron having approximately 12% to 15% silicon. It will be understood, however, that such high silicon cast iron compositions may be extremely brittle and not readily susceptible to machining, welding, and like operations, so that difficulty may be experienced in connecting a plurality of anodes together, should this be desired, as well as in connecting the anodes to their respective lead wires. It has also been discovered that, due to the effect of the impressed current on such a cathodic protection system and to the electrochemical activity of the material required for electroconductivity necessary for the lead wires, the point of connection between the lead wires and the anodes, as well as the point of connection between two anodes directly connected together, is susceptible to accelerated corrosion to such an extent that the point of connection or the connection itself may rapidly corrode so as to be inoperative in a shorter time than is expected for the anode life, thereby causing the system to break down and requiring maintenance and inspection at more frequent intervals than are required by the life of the high silicon anodes themselves.

Accordingly, it has been found desirable to provide means for interconnecting a plurality of anodes with each other and/or their respective lead wires to insure, according to this invention, increased protection of the connections themselves from corrosion and electrical and electrolytic effects. It will also be understood that, since the cathodic protection system in FIG. 1 is merely illustrated as applied to a subterranean pipe line, other forms of anodes and interconnections thereof have been found to be advantageous for other types of installations such as corrosion protection of water tanks and steam pipes, metal piers installed in salt water, the hulls of ships subjected to salt water corrosion, subterranean or submarine cables installed either directly in contact with earth or water or within protecting conduits running therethrough and the like, as noted in said copending application. Also the size and/or particular configuration of the anodes themselves have been found to have a bearing on anode life and efficiency, both from the standpoint of electrochemical activity as well as from the standpoint of ease of installation for a particular application.

Referring to FIG. 2, a connection according to this invention is shown for joining a lead wire 20 to an anode 15 in a manner which protects the point of connection from electrochemical activity as well as assuring sufficient mechanical strength in the connection from electrochemical activity as well as assuring sufficient mechanical strength in the connection to withstand the mechanical forces to which the anode and lead wire may be subjected in use. As shown in FIG. 2, the end of the anode 15 to be connected to the lead wire 20 may be provided with an enlargement 30 to insure a sufficient thickness of anode material around the point of connection in which there is a cast-in recess 31 of relatively large diameter and a further recess 32 of substantially smaller diameter. Because of the difficulty, particularly with high silicon cast iron anodes, of machining the anode to obtain a threaded connection and the like and/or obtaining a good weld or brazed connection between the anode material and the lead wire 20, a brazed bushing 35 is provided with the outside diameter substantially the same as the diameter of recess 32 and with an inside diameter to accommodate lead wire 20 after the electrical insulation 22 has been stripped therefrom. The outer surface of bushing 35 is preferably knurled so as to form a press fit in the recess.

To connect lead wire 20 into anode 15, insulation 22 is stripped from the end of lead wire 20, and a circular metal drive washer 40 is inserted over the bared end of wiring 20 forcing the brazed connection firmly into bushing 35. With the wire brazed in place, bushing 35 is driven, by means of the drive washer 40 and a suitable driving tool, firmly into the smaller recess 32 where, by virtue of the knurled exterior of bushing 35 and the correlated diameter of recess 32, the bushing is firmly anchored in place forming a press fit as distinguished from a slip fit or merely a snug fit. The satisfactory results have been obtained with such connections resisting forces tending to pull the lead 20 out of the anode 15 over 325 pounds, and a firm mechanical and electrical connection is thus provided between lead wire 20 and anode 15 without the necessity of attempting to machine the high silicon anode or weld or braze the lead wire directly thereto.

After the bushing 35, with lead wire 20 brazed thereto, is driven into recess 32, recess 31 is filled with a commerically available plastic sealing compound indicated at 41, known as "Ozite" and understood to comprise an asphalt base caulking compound. This sealing compound 41 fills recess 31 and cooperates with the insulation 22 around lead wire 20 to provide a moisture resistant seal for the metallic compounds adjacent the juncture of lead wire 20 and anode 15. To close the outer end of recess 31 and aid in maintaining the sealing compound 41 in position, one or more plastic sealing washers 42 are inserted as indicated in the drawing.

Figure 5:
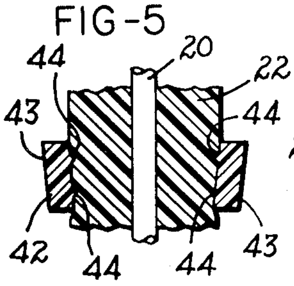
FIG. 5 is a detail view on an enlarged scale of a plastic closure washer as shown in FIGS. 2–4.

Satisfactory results have been achieved for subterranean installations as well as for installations immersed in fresh or salt water by using for a lead wire 20 an electrical cable having a multiple strand polyethylene insulation with an outer jacket of polyvinyl chloride plastic and with the sealing washers 42 being of polyethylene plastic. Sealing washers 42 are preferably made of substantially the configuration indicated in FIG. 5 and including the tapered sides 43 for increased force fit into recesses 31 and a plurality of internal compression rings 44 for tight gripping engagement with the outside surface of insulation 22 of lead wire 20.

Instead of brazing lead wire 20 to bushing 35 as just described, an alternative satisfactory electrical connection is illustarted in FIG. 3 in which a bushing 45 is provided with the exterior surface thereof knurled as indicated at 46, as with bushing 35, and having a reduced diameter sleeve portion 47 for receiving the end of lead wire 20 so that sleeve 47 can be crimped about lead wire 20 as at 48 in known manner.

As indicated in FIG. 6, further protection of the connection between lead wire and anode may be achieved, particularly for sea water installations, by providing an undercut portion 50 at the outer end of the anode surrounding recess 31. After inserting the knurled bushing 35 with the lead wire 20 brazed thereto and the sealing compound 41 and sealing washer 42, an outer closure or cover 51 of a hardenable plastic or resin such as, for example, a cast epoxy resin, is provided and molded into place so that the resin cover 51 engages and interlocks into the undercut 50 and around the insulation 22 of lead wire 20 to have a protective cover over the end of the anode and surrounding the sealed electrical connection therein.

Figure 7:
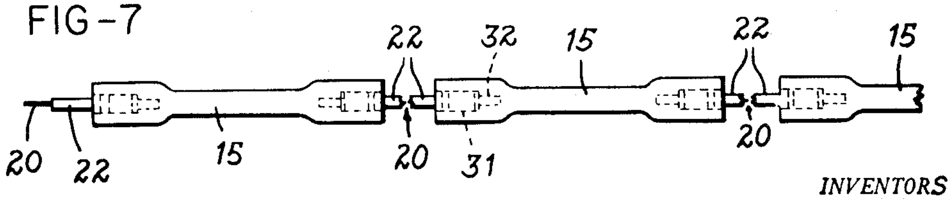
FIG. 7 is a view of a plurality of anodes connected together by lead wires for a cathodic protection system embodying this invention.

The foregoing electrical connections have been found satisfactory for connecting the lead wire to one end of an anode buried adjacent a pipe line, as diagrammed in FIG. 1, or for interconnecting a plurality of anodes with lengths of wire therebetween as indicated in FIG. 7 for installation adjacent a pipe line or electric cable. Satisfactory results have been achieved with the anodes 15 cast substantially in the configuration shown to provide sufficient surface area and quantity of anode material all along the anode and notwithstanding the presence of the recesses 31 and 32 and the electrical connection in the ends thereof. For some installations, such as the cathodic protection of piers and the like, it may be desired to have the anodes 15 suspended horizontally, and, to this end, as indicated in FIG. 9, a plurality of holes 49 may be provided in the shank of the anode without interference with the mechanical or electrical connection of lead wires to one or both ends of the anode.

Figure 8:
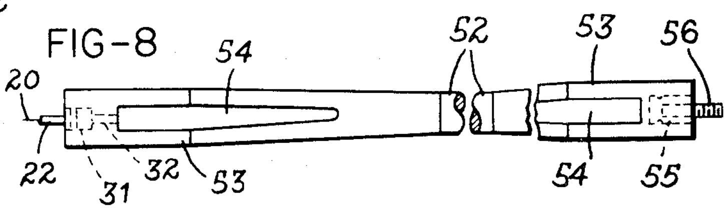
FIG. 8 is a view in elevation of one form of a cathodic protection anode embodying this invention.

With some installations, such as tall stand pipes and water tanks, it may be desired to have the anode extended throughout the length or height of the tank. The mechanical properties of the anode material, however, and particularly of high silicon cast iron anode material, may preclude providing an anode more than four or five feet long at a suitable diameter which may satisfactorily be around 1¼ inch in the middle to two inches at the ends. In such a case, satisfactory results have been obtained by providing four or five feet long anode segments to be mechanically joined end to end as desired, and as described in said copending application. Such an anode is illustrated in FIG. 8 having a reduced diameter center portion with enlarged end portions carrying flats 52 to accommodate a wrench or other tool for tightening the anodes together.

Since high silicon anode materials may not be susceptible to machining and since the juncture between anode segments has been found to be a point of weakness where accelerated corrosion may occur, a connection for two such segments is provided to include a cast in cylindrical insert 55 of a machineable metal, such as Monel metal, having a threaded bore to accommodate a headless bolt 56 by means of which two similar anode segments can be mechanically secured together. One end of one such anode segment is provided with the electrical lead wire connection such as illustrated in FIG. 2 or 3.

If it is desired to secure an anode directly to the structure to be protected in the case of, for example, the hull of a ship, the side of a tank, or a steam boiler, or the like, where the anode can be affixed through the metal wall of a structure to be protected, satisfactory results are achieved with an anode illustrated in FIGS. 12 and 13. Here a circular anode 65 of semirounded cross section is provided with a machineable insert 66 integrally cast thereinto and having a threaded bore 67. Recesses or indentations 69 in the insert 66 are provided to hold insert 66 in place as cast into the anode 65. The nonrounded face of anode 65 is provided with ribs 68 and laid against the hull 70, or other metal wall to be protected, preferably with an insulating rubber plastic sheet 71 therebetween, and the anode is held in place from the other side of wall 70 by a bolt 72 through wall 70 threadably engaged into the threaded bore 67 of the insert 66. This same bolt 72 of course, provides the necessary electrical connection for a lead wire 73 to the anode. The size of sheet 71 is preferably substantially larger than anode 65 to avoid concentration of current, and a plastic sealing compound is applied between anode 65 and sheet 71 (as indicated at 74) so that, as bolt 72 is tightened, sealing against leakage between the anode and the wall is provided by the sealing compound, the ribs 68 and sheet 71.

Whereas the arrangement indicated in FIG. 7 is, particularly adapted for the cathodic connection of extended structures such as pipe lines and the like, the installation of such a string of anodes is facilitated if they can be buried in a trench adjacent the pipe line. With such applications a plurality of small anodes, perhaps less than a foot long, may readily be installed. In the case of cathodic protection of telephone cables and like structures which are contained within substantially larger subterranean conduits, installation may be aided if a string of anodes is provided to be threaded or pulled through the existing conduit in the same manner as the cable is threaded or pulled therethrough. For such types of installation, the arrangement of FIG. 7 may be more cumbersome than desired or the pulling may exceed the mechanical strength of the electrical connection shown. This is particularly true with telephone cables where the distance between manholes is usually standardized at approximately 700 feet and where one anode is desired about every 50 feet.

With installations where a plurality of small anodes are spaced at intervals along a cable of appreciable length, it may be more convenient from the standpoint of installation and maintenance if an anode could be inserted and connected at any point along the cable.

Referring to FIGS. 10 and 11, such an anode structure is illustrated. It will be understood, in this connection, that crimped electrical connectors are now available for engaging two ends of a wire by crimping with such security that the crimped connection is as strong mechanically as the wire itself, and this situation is utilized in the anode illustrated in FIGS. 10 and 11.

An anode 75 is provided as illustrated in section in FIG. 10 having a substantially cylindrical configuration with two large hollows 76 and 77 one of which may have a constricted neck portion 78. The cross wall 80 between hollows 76 and 77 has a circular passage 81 therein. A brass bushing 85 is provided having a flange portion 86 thereon and an extension 87 adapted to be crimped around and form a crimped connection between the two ends of two pieces of lead wire 20. Bushing 85 and connecting member 87 have a longitudinal central passage 88 therethrough for receiving ends of lead wires 20, and the outer diameter of bushing 85 is substantially the same as the inner diameter of passage 81 preferably knurled. A plastic protecting and insulating cap 90 is provided of a size which will be a press fit into the open end of hollow 77.

Such an anode may be installed directly in the center of a long cable or lead wire 20 by severing the cable at the point where it is desired to install the anode. After severing the cable, the anode 75, without bushing 85 is threaded over part of the cable, as indicated at the left end of FIG. 11, and the cap 90 is threaded over the other severed end of the cable. The insulation 22 is removed so that both severed ends of the lead wire 20 are bared, and then both ends 20 of the lead wire are inserted from opposite directions into the crimping connector 87 on bushing 85 and a crimp connection made at that point in known manner. With the two ends of the wires 20 securely interconnected and crimped into connector 87, anode 75 is then slid along the wire and bushing 85 driven forcibly into passage 81 in cross wall 80 within the anode to form a firm mechanical and electrical connection therewith. Protecting cap 90 is then slid in place to close the end of hollow 77 and is held permanently in place by its pressed fit and, if desired, a cemented joint at 91. With the assembly thus made, plastic sealing compound is injected to fill holes 76 and 77 as by an injecting gun through the end openings in the anode or through suitable injection opening 92 communicating with holes 76 and 77 through the outer walls of the anode. With such an arrangement, a desired plurality of small anodes may be installed anywhere along the length of a cable in a manner so that, although the connections with the cable are protected, the tensile strength of the entire assembly is not appreciably diminished and remains independent of the strength of the actual connection between the cable and the anode.

Figure 14:
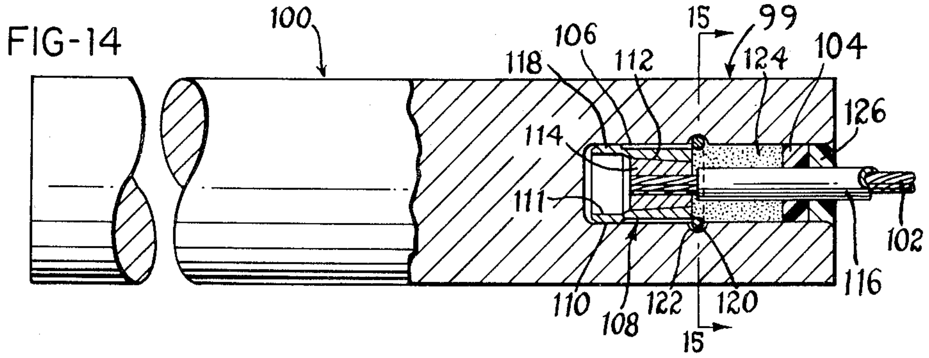
FIG. 14 is a view similar to FIG. 2 illustrating a different lead wire connection for a cathodic protection system embodying this invention.
Figure 15:
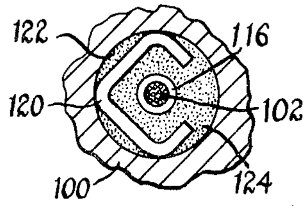
FIG. 15 is a view partly in section and partly in elevation taken generally along the line 15—15 of FIG. 14.

Referring to FIGS. 14 and 15, an alternate form of an anode of the type illustrated in FIGS. 2 and 3 is shown wherein the end 99 of the anode 100 to be connected the lead-in wire 102 may be provided with an enlargement (not shown) to insure a sufficient thickness of anode material around the point of connection. In the end 99, there is formed an outer cast in recess 104 having a diameter slightly larger than that of the cast in recess 106. Due to the difficulty of machining the anode, as was mentioned previously, a bushing assembly 108 is provided for securing the lead-in wire 102, and including a bushing body 110 softer than the anode and of electrically conductive material having an outside diameter slightly larger than the inner recess 106. The outside of the surface of the bushing body 110 may be smooth or knurled as desired.

The bushing body includes an inside counterbore 111 and taper 112 to accommodate a split tapered plug 114 having an inside diameter large enough to accommodate the lead wire 102 after the electrical insulation 116 has been stripped therefrom. The taper of the plug 114 may be 3° per side, although tapers of other degrees may be utilized to provide a tapered counterbore which receives a tapered plug. A thin wall section 118 is formed along the portion of the outer surface of the bushing 110 to provide an interference fit with the anode body 100 and thus the bushing deforms when pressed into the anode recess thereby preventing fracture of the anode body during assembly.

To connect the lead wire 102 into the anode 100, the electrical insulation 116 is stripped from the end of lead wire 102 and the split tapered metallic plug 114 is inserted over the bared end of wire 102. The split tapered plug is then pressed into the tapered portion 112 of the bushing 110 causing the plug 114 to close tightly around the lead wire. With the lead wire firmly locked into bushing 110, the bushing is then pressed firmly into the inner recess 106 where by virtue of the interference fit between the anode and the bushing, the bushing is firmly anchored in place. Snap ring 120 which may be non-circular in shape is then pressed into snap ring groove 122 for further anchoring the bushing against any excessive axial movement. The resultant joint will then resist forces equal to the breaking strength of the lead wire which would tend to pull the lead wire 102 out of the anode 100, and a firm mechanical and electrical connection is thus provided between the lead wire 102 and the anode 100 without the necessity of attempting to machine the high silicon anode, or weld or braze the lead wire directly thereto.

Subsequent to installation of the snap ring, an Ozite potting compound 124, mentioned above, is placed within a portion of the outer recess 104 and cooperates with the insulation 116 around the lead wire 102 to provide a moisture resistant seal for the metallic components adjacent the juncture of lead wire 102 and anode 100. To close the outer end of recess 104 and aid in maintaining the seal compound 124 in position, one or more plastic sealing washers 126 of the type previously mentioned are inserted as indicated in the drawing.

Figure 16:
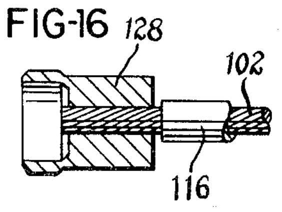
FIG. 16 is a view of an alternate form of bushing member connecting the lead wire to the anode.

An alternate electrical connection between the anode body 100 and lead-in wire 102 may be made as shown in FIG. 16 wherein the lead wire 102 is brazed to a bushing body 128 which may be firmly pressed into the inner recess 106 and retained as described above. The bushing 128 has an outer configuration similar to that of bushing 118, however, brazing of the lead-in wire to the bushing body 128 eliminates the necessity of the tapered plug 114 shown in the bushing 110.

Figure 17:
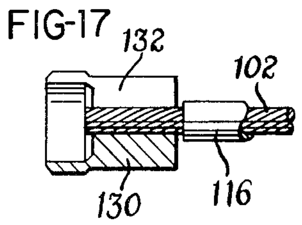
FIG. 17 is a further modification of the bushing shown in FIGS. 15 and 16.

Another form of electrical connection between anode 100 and the lead wire 102 is shown in FIG. 17 wherein the lead wire 102 is brazed to a bushing 130 which is split, as indicated at 132, and which may be firmly pressed into inner recess 106 and retained as above described. Again, the bushing body 130 has an outer configuration similar to that of bushing 110, and the provision of a split arrangement eliminates the necessity of the tapered plug 114 used in connection with the bushing shown in FIG. 14.

Figure 18:
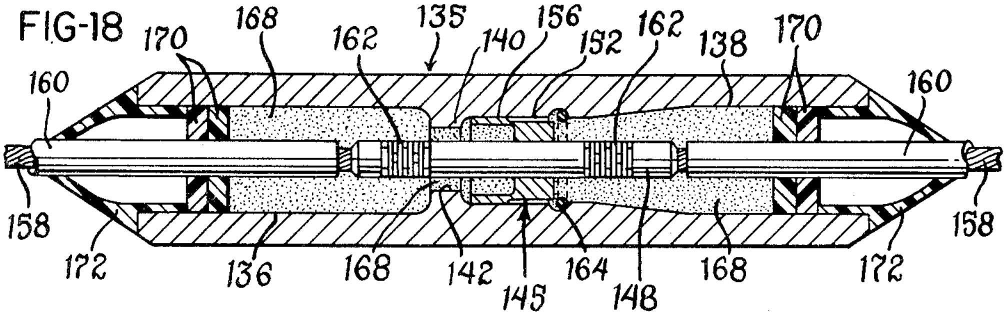
FIG. 18 is a view similar to FIG. 10 illustrating a different anode embodying this invention and adapted to be connected to a lead wire intermediate to the ends thereof.
Figure 19:
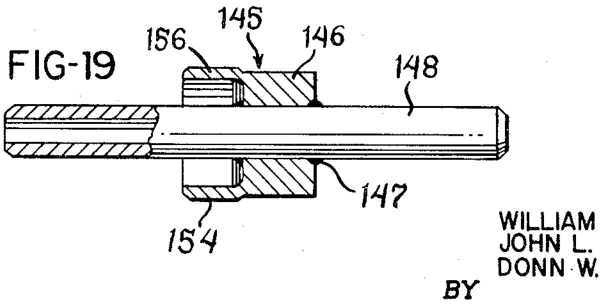
FIG. 19 is a view of the bushing member with the anode arrangement of FIG. 18.

FIGS. 18 and 19 illustrate an alternate anode structure adapted to be inserted and connected at any point along a conductive cable of appreciable length. The cylindrical anode 135 is provided with two large hollows or apertures 136 and 138 separated by a cross-wall 140 having a circular passage 142 therein. A connector assembly 145 (FIG. 19) is provided with a bushing 146 brazed as at 147 to a copper tube 148. The bushing or insert 146 of conductive metal has an outside diameter slightly larger than the recess 152 located between the cross-wall 140 and hollow 138. The outer surface 154 of the bushing 146 which is pressed into anode 135 forming an interference fit may be smooth or knurled. The bushing 146 has a thin wall 156 in the section which forms the interference fit with the anode, and thus the bushing will deform when pressed into the anode without causing fracture thereof.

Such an anode may be installed directly in the center of a long cable or lead wire 158 by severing the cable at the point where it is desired to install the anode. After severing the cable, the anode 135, without the connector 145, is threaded over part of the cable, as described in connection with FIG. 11. The insulation 160 is removed from a portion of each end of the severed cable so that the ends thereof are bared. The bared ends of the lead wire are inserted from an opposite direction into the copper tube 148 of the connector 145, and the copper tube is then crimped as at 162 in a known manner about the ends of the wire.

With the wire firmly crimped in the tube 148, the bushing 146 is then pressed firmly into place in the small recess 152, and by virtue of the interference fit between the anode of the bushing, the bushing is firmly anchored in place. Snap ring 164 is then pressed into snap ring groove 166 further anchoring the bushing against any excessive axial movement thereof. Thus assembled, the joint will then resist forces equal to the breaking strength of the lead wire which would tend to pull the lead wire out of the anode, and a firm mechanical and electrical connection is provided between the lead wire 158 and the anode 135 without the necessity of attempting to machine the high silicon iron anode by welding or brazing the lead wire directly thereto.

Subsequent to installation of the snap ring 164, an Ozite potting compound 168, described above, is placed in the recess and a portion of the large hollows 136 and 138, and cooperates with the insulation 160 around the lead wire 158 to provide a moisture resistant seal for metallic components adjacent the juncture of lead wire 158 and anode 135. To close the outer end of each of the large hollows 136 and 138 and aid in maintaining the seal compound in position, a pair of plastic sealing washers 170 of the type previously mentioned are inserted as indicated in the drawing. An additional seal element 172 is placed on each end of the anode, and these elements containing an interior hollow section allow flexing of the lead wires with respect to the ends of the anode.

It will, thus, be seen that the present invention provides means for establishing a firm and strong mechanical and a protected and insulated electrical connection between a plurality of anodes and/or their respective lead wires as required for various types of anode installations in cathodic protection systems, and that such mechanical and electrical connections are protected from excessive corrosion notwithstanding the different electrochemical properties of the anodes and the lead wires and notwithstanding the use of anode material such as high silicon irons which are themselves not particularly susceptible to machined joints or other forms of mechanical or electrical connections to themselves or different materials.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An anode of the character described for a cathodic protection system, comprising in combination a generally cylindrical body portion of high silicon content cast iron, said silicon content rendering said body too hard and brittle for ready machining, an elongated generally cylindrical recess in the end of said body portion, an elongated insert of material different from said high silicon content cast iron including at least a thin wall portion having an external diameter proportioned with respect to the internal diameter of said recesss providing an interference fit connection with said body portion within said recess and at a location spaced from the outer end thereof, a peripheral groove in said recess, a snap ring received in said groove and cooperating with said thin wall section to effect substantial limited axial movement of said insert against pulling forces encountered in use, an insulating lead wire extending from said insert out of said recess, means cooperating with said insert for affixing said lead wire thereto effecting an electrical connection from said lead wire through said insert to said body portion and effecting a strong mechanical connection between said lead wire and said body portion for withstanding pulling forces encountered in use, and a plastic insulating means in said recess covering said insert and said lead wire for insulating said lead wire and said insert both chemically and electrically.

2. An anode of the character described for a cathodic protection system, comprising in combination a generally cylindrical body portion of high silicon content cast iron, said silicon content rendering said body too hard and brittle for ready machining, an elongated generally cylindrical recess in the end of said body portion, an elongated insert of material different from said high silicon content cast iron including a surface portion thereof having an external diameter proportioned with respect to the internal diameter of said recess providing an interference fit connection with said body portion within said recess and at a location spaced from the outer end thereof, said portion of said insert having a thin wall section providing said interference fit, a peripheral groove in said recess, a snap ring received in said groove and cooperating with said thin wall section to effect substantial limited axial movement of said insert against pulling forces encountered in use, an insulating lead wire extending from said insert out of said recess, means including a split tapered metallic plug received in said insert for affixing said lead wire to said insert effecting electrical connection from said lead wire through said insert to said body portion and effecting a strong mechanical connection between said lead wire and said body portion for withstanding pulling forces encountered in use, and a plastic insulating means in said recess covering said insert and said lead wire for insulating said lead wire and said insert both chemically and electrically.

3. An anode of the character described for a cathodic protection system and adapted to be inserted and connected at any point along a conductive cable, comprising in combination a generally cylindrical body portion of high silicon content cast iron, said silicon content rendering said body too hard and brittle for ready machining, an elongated generally cylindrical recess in said body portion, an aperture in each end of said body portion communicating with said recess, an elongated bushing insert of material different from said high silicon content cast iron including a thin wall portion having an external diameter proportioned with respect to the internal diameter of said recess providing an interference fit connection with said body portion within said recess and at a location spaced from the outer end thereof, a peripheral groove in said recess, a snap ring received in said groove and cooperating with said thin wall section to effect substantial limited axial movement of said insert against pulling forces encountered in use, an insulating lead wire extending from said insert out of said recess and through said apertures, means cooperating with said insert for affixing said lead wire to said insert effecting an electrical connection from said lead wire through said insert to said body portion and effecting a strong mechanical connection between said lead wire and said body portion for withstanding pulling forces encountered in use, and a plastic insulating means in said recess covering said insert and said lead wire for insulating said lead wire and said insert both chemically and electrically.

4. An anode of the character described for a cathodic protection system and adapted to be inserted and connected at any point along a conductive cable, comprising in combination a generally cylindrical body portion of high silicon content cast iron, said silicon content rendering said body too hard and brittle for ready machining, an elongated generally cylindrical recess in said body portion, an aperture in each end of each body portion communicating with said recess, an elongated bushing insert of material different from said high silicon content cast iron including a surface portion thereof having an external diameter proportioned with respect to the internal diameter of said recess providing an interference fit connection with said body portion within said recess and at a location spaced from the outer ends thereof, said portion of said insert including a thin wall section providing said interference fit, a peripheral groove in said recess, a snap ring received in said groove and cooperating with said thin wall section to effect substantial limited axial movement of said insert against pulling forces encountered in use, an insulating lead wire extending from said insert out of said recess and through said aperture, means cooperating with said insert for affixing said lead wire thereto, said means including a metallic tube affixed to said insert extending into said apertures for effecting electrical connection from said lead wire through said insert to said body portion and effecting a strong mechanical connection between said lead wire and said body portion for withstanding pulling forces encountered in use, and a plastic insulating means in said recess covering said insert and tube and said lead wire for insulating said lead wire and said insert both chemically and electrically.

References Cited by the Examiner

UNITED STATES PATENTS

| | | | |
|---|---|---|---|
| 1,788,485 | 1/1931 | Gunderson | 204—196 |
| 1,900,011 | 3/1933 | Durham | 204—197 |
| 2,486,871 | 11/1949 | Osterheld | 204—197 |
| 2,620,297 | 12/1952 | Stobie et al. | 204—197 |
| 2,732,021 | 1/1956 | Taft | 204—197 |
| 2,779,729 | 1/1957 | Jorgensen | 204—197 |
| 2,803,602 | 8/1957 | De Cowsky et al. | 204—196 |
| 2,816,069 | 12/1957 | Andrus | 204—196 |
| 2,926,128 | 2/1960 | Flower | 204—196 |
| 2,949,417 | 8/1960 | Preiser et al. | 204—196 |
| 3,038,849 | 6/1962 | Preiser | 204—196 |
| 3,043,765 | 7/1962 | Bryan et al. | 204—196 |
| 3,049,479 | 8/1962 | Preiser et al. | 204—196 |
| 3,069,336 | 12/1962 | Waite et al. | 204—197 |

JOHN H. MACK, *Primary Examiner.*

JOSEPH REBOLD, MURRY TILLMAN, WINSTON A. DOUGLAS, *Examiners.*